May 5, 1964  C. H. JAMES  3,131,458
ROTARY CUTTERS
Filed June 26, 1962  3 Sheets-Sheet 3

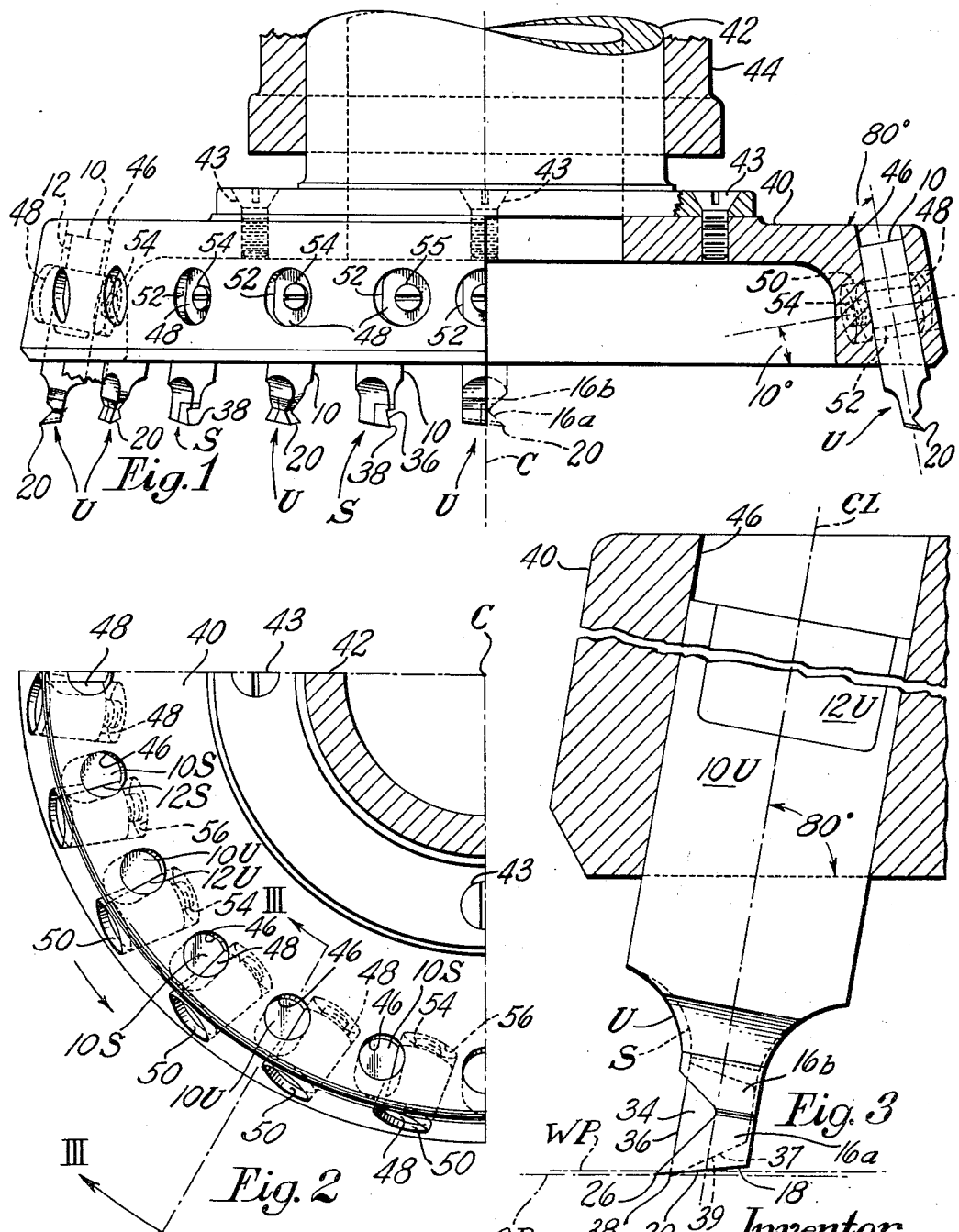

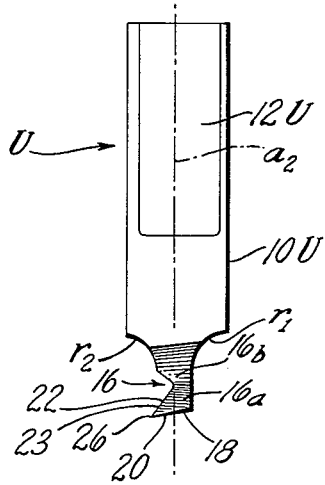
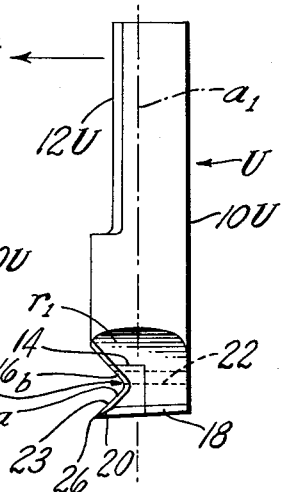
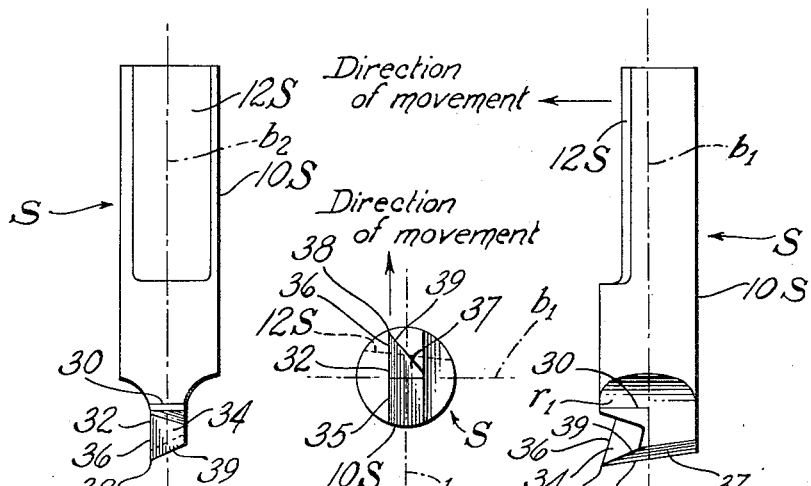

United States Patent Office 3,131,458
Patented May 5, 1964

3,131,458
ROTARY CUTTERS
Cyril H. James, deceased, late of Birstall, England, by Evelyn Alice James, administratrix, Birstall, England, assignor to United Shoe Machinery Corporation, Flemington, N.J., a corporation of New Jersey
Filed June 26, 1962, Ser. No. 206,139
Claims priority, application Great Britain June 28, 1961
5 Claims. (Cl. 29—105)

This invention relates to shoe machinery in general and more particularly to rotary cutter for use in shoe machines intended for reducing and roughing shoe parts such as soles and the like.

There will hereinafter be illustrated and described a rotary cutter made in accordance with the invention which is particularly suitable for use in a machine of the kind disclosed in United States Letters Patent No. 3,061,853, granted November 6, 1962, in the name of Robert C. Quarmby.

The Quarmby patent discloses a machine having a rotary cutter which, during the operation of the machine, in effect, sweeps across a work piece held in a matrix which is moved beneath the cutter. The matrix is shaped to raise selected portions above the level of the remainder of the work piece and into the field of action of the cutter. The work piece is generally a shoe sole and, according to the type of matrix employed, any or all of the various operations, such as heel breast flap forming, shank reducing, feather edging and roughing may be performed upon the relatively raised portions of the sole. As the work piece, or sole as it will alternatively hereinafter be called, passes beneath the rotating cutter, the latter not only removes material from portions of the sole which project above the matrix but leaves those portions on which it has operated in a roughened condition ready for cement attaching and like operations.

The Quarmby cutter comprises an inverted cup-shaped hub having secured to its lower face a plurality of cutter teeth which extend downwardly and are provided with cutting edges at their lower ends. The cutter teeth heretofore employed in the Quarmby machine have not proved entirely satisfactory when operating upon sole blanks of all of the various types of material from which such blanks are made. In some instances, a "burr," "feather" or slight step is left at what may be referred to as the trailing edge of the sole, i.e., that edge at which the moving teeth of the cutter leave the work (it being appreciated that the teeth of the cutter sweep across successive portions of the blank in generally arcuate paths as the sole blanks travel beneath the cutter).

It is an object of this invention to provide an improved rotary cutter for operating on soles and the like which is particularly adapted to reduce and rough without producing a "burr," "feather" or other undesirable step on the sole.

Another object of this invention is to provide a cutter for operating upon soles and the like which will produce a desired beveled contour with a roughened surface without loosely attached, though unsevered, projections on said surface or the edge of the sole.

Still another object of this invention is to provide a cutter for operating on soles and the like which is inexpensive to construct and easy to operate.

In accordance with these objects and as a feature of this invention there is provided a rotary cutter for operating upon soles and the like comprising an inverted cup-shaped hub carrying two sets of cutter teeth arranged, one from each set, alternately around the cutter hub equidistant from each other and from the axis of rotation of the hub. The teeth project downwardly from the hub and define a cutting plane. One set of teeth performs an undercutting operation on the work by making a substantially lateral sloping cut thereby to raise an unsevered split or chip, and the other set of teeth makes a substantially upright cut to sever cleanly the chip raised by the first set of teeth. The severing teeth deflect the chip out of the path of movement of the teeth without leaving a "burr" or other loosely attached projections on the sole.

The above and other features of the invention, including various novel details of construction and combinations of parts, will now be more particularly described with reference to the accompanying drawings and pointed out in the claims. It will be understood that the particular cutter embodying the invention is shown by way of illustration only and not as a limitation of the invention. The principles and features of this invention may be employed in varied and numerous embodiments without departing from the scope of the invention.

In the drawings,

FIG. 1 is a side elevation partly in section and with parts removed of an illustrative cutter embodying the invention;

FIG. 2 is a plan view partly in section and with parts removed of a quadrant of the cutter shown in FIG. 1;

FIG. 3 is an enlarged sectional view taken on the line III—III of FIG. 2 showing two adjacent cutter teeth in superposed operative relationship;

FIG. 4 is an elevational view of one form of an undercutting tooth with which the illustrative cutter is provided and seen moving toward the viewer;

FIG. 5 is a bottom plan view of the tooth shown in FIG. 4;

FIG. 6 is a right side elevation of the tooth shown in FIG. 4;

FIGS. 7, 8 and 9 are views similar to FIGS. 4, 5 and 6, respectively, but showing one form of severing tooth with which the illustrative cutter is also provided;

Undercutting Tooth

Figure 10:
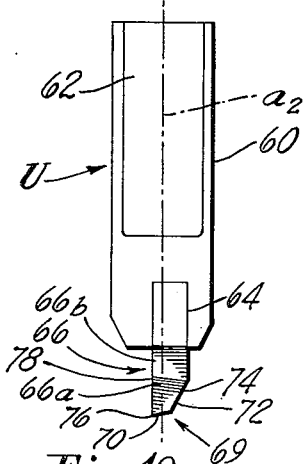
FIGS. 10 to 12 and 13 to 15 are views similar to FIGS. 4 to 6 and 7 to 9, respectively, showing another form of an undercutting tooth and a severing tooth, respectively; and, FIG. 16 is a view similar to FIG. 3 showing the alternative teeth in superposed operative relationship seen moving toward the viewer.
Figure 11:
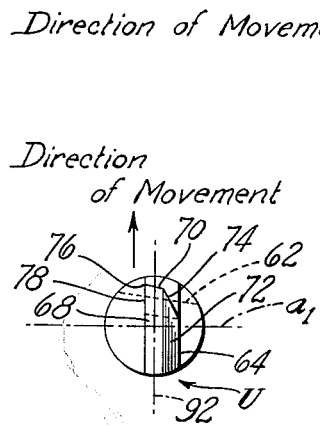
Figure 12:
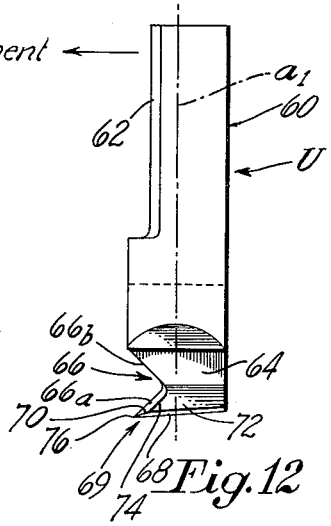

Referring first to FIGS. 4 through 6, an undercutting tooth U will now be described. Each undercutting tooth has a stem portion designated 10U which for the most part is cylindrical in cross section. A flat 12U is formed on the stem at an angle of 5° to an axial datum plane $a_1$ (FIGS. 5 and 6). The flat is adapted to be engaged by a wedge member, hereinafter to be described, for clamping the cutter tooth in a cutter hub in a manner also hereinafter to be described. The lower or cutting portion of each tooth extends downwardly as a continuation of radii $r_1$ and $r_2$ machined in the sides of the stem 10U. The tooth is provided with a sintered carbide tip or bit 14 and the cutting portion of the tooth, including the carbide tip, is machined to the shape shown in FIGS. 4 to 6. The cutting portion includes a forward facing, substantially V-shaped, cutting surface 16 having diverging lower and upper face portions 16a and 16b, respectvieIy. An inclined bottom surface or face 18 of the tooth intersects the face 16a and there forms a cutting edge 20. An inclined left side face 22 lies parallel with an axial plane $a_2$ normal to the datum plane $a_1$ and intersects the face 16a along an edge 23 which slopes inwardly and rearwardly when the tooth is viewed as in FIG. 4 where the tooth is seen moving toward the viewer. The point of intersection 26 between the edges 20 and 23 is called the cutting point. As the cutter rotates, the cutting edge 20 slices into the sole blank material raising a chip to be severed by a severing tooth next to be described.

Severing Tooth

FIGS. 7 to 9 disclose the details of construction of a severing tooth S. It will be seen to include a circular stem portion 10S having a flat 12S formed at 5° to an axial datum plane $b_1$, both the stem and flat being similar to the stem 10U and flat 12U of the undercutting tooth U. Each severing tooth is also provided with a carbide tip 30 machined to the shape shown. The cutting portion of the severing tooth S, which, as in the undercutting tooth U, extends as a continuation of radii $r_1$ and $r_2$, includes a surface 32 lying parallel with an axial plane $b_2$ of the stem normal to the datum plane 6. The surface 32 is intersected by an oblique cutting surface 34, the intersection forming a cutting edge 36 which extends upwardly and rearwardly with respect to the direction of movement of the cutter. The severing tooth has an inclined bottom surface 37 which intersects the surface 32 along a bottom edge 35 and the cutting surface 34 along an edge 39. The point of intersection 38 between the edge 35, the edge 39, and the cutting edge 36 is called the cutting point. As the cutter rotates, the cutting edge 36 severs the chip raised by the preceding undercutting tooth U in a manner hereinafter to be described.

Cutter Assembly

The assembled cutter will be seen in FIGS. 1 and 2. The cutter includes a substantially circular, centrally apertured hub 40 which is secured to a hollow flanged shaft 42 by screws 43. The shaft 42 is journaled for rotation in a bearing 44. The cutter is rotated in a counterclockwise direction about its central axis C when viewed from above or as shown in FIG. 2 by means not shown but similar to those described in the above-identified patent of Quarmby. The cutter includes 24 teeth, 12 undercutting teeth U and 12 severing teeth S, alternately arranged one from each set around the cutter hub 40 and spaced equidistant from each other and from the axis C of the hub.

The stem 10 of each tooth (undercutting and severing) is inserted in a bore 46 which is inclined downwardly and outwardly at an angle of 10° from the axis C of the cutter hub in a radial direction whereby, when the teeth are assembled their axial data planes $a_1$ and $b_1$ (FIGS. 5 and 8) lie in radial planes of the cutter hub. Each tooth is held in the bore 46 with its cutting tip extending below the hub as seen in FIG. 1 by a wedge 48. The wedge is, for the most part cylindrical, and fits within a cylindrical bore 50 extending in a radial plane inwardly of the cutter hub 40 but downwardly at an angle of 10° from a plane normal to the axis C of the cutter. The bore 50 intersects the bore 46. Each wedge 48 has a flat 52 formed at an angle of 5° with its axis which engages the flat 12 on the tooth stem. A slotted set screw 54 is threaded in each wedge 48, the unslotted end of the set screw being engageable with the bottom 56 of the bore 50. Thus, when the set screw is rotated in the conventional clockwise direction, the wedge 48 is moved outwardly of the bore 50 wedging the cutter tooth tightly within its bore 46. After being assembled in the manner above described, the teeth are adjusted so that their cutting points 26 and 38 are substantially coplanar and define a cutting plane CP (FIG. 3).

Operation

FIG. 3 which is a view taken along the line III—III in FIG. 2 normal to a plane including the axes of two adjacent teeth, one undercutting and one severing, showing the teeth in assembled position moving toward the viewer, the undercutting tooth U being closer to the viewer than a severing tooth S.

The axis C of the cutter hub 40, while herein shown as vertical, may be inclined slightly to the vertical at a small angle. The cutter is positioned with respect to a sole or work piece WP as shown in FIG. 3, so that the cutting plane CP defined by the cutting points 26 and 38 is below the surface of the work piece WP, which is to be reduced and roughed. Part of the bottom surfaces 18 and 37 of the undercutitng and severing teeth, respectively, will also in operation, extend below the surface of the work piece WP. As the undercutting tooth U moves across the work or toward the viewer, as seen in FIG. 3, the cutting edge 20 will slice into the sole blank material making a slightly sloping or beveled lateral cut. A chip will be raised by the upwardly and rearwardly inclined lower portion 16a of the cutting surface 16. The right hand or inner edge of the chip will be separated but the left hand or outer edge will remain attached to the surface of the work piece WP. The chip will curl first upwardly and rearwardly and slightly outwardly or to the left, as seen in FIG. 3, until it reaches the surface 16b whereupon it may, depending upon spacing between adjacent teeth, be caused to curl slightly forwardly. The chip, however, remains attached to the surface of the work piece WP outwardly of the path described by the cutting point 26 until the cutting edge 36 of the severing tooth S moving directly behind the undercutting tooth U makes a substantially upright cut to the depth of its cutting point 38. The beveled face 34 of the severing tooth S will deflect the then severed chip in a directicon generally inwardly of the cutter or to the right, as seen in FIG. 3, whereupon it may be collected by a chip removal unit which, although not herein shown, could be mounted at the upper end of the hollow driving shaft 42.

Succeeding sets of undercutting and severing teeth repeat the operation on adjacent portions of the sole blank in a continuous process since the sole blank is moving beneath the cutter. The paths of succeeding sets of teeth will overlap somewhat the paths of preceding sets depending upon the relative rate of feed of the sole and the speed of rotation of the cutter. The resultant surface is a pattern of minute saw tooth arcuate ridges.

Alternative Form of Teeth

FIGS. 10 through 12 and 13 through 15, show an alternate form of an undercutting and a severing tooth, respectively, made in accordance with the invention. The undercutting tooth U, like the undercutting tooth above described and shown in FIGS. 4 to 6, includes a stem 60 provided with a flat 62 formed at 5° to a datum plane $a_1$ and has a sintered carbide tip 64 inserted in the lower portion of the stem. The tip 64 is machined to include a forward facing, substantially V-shaped, cutting surface 66 having diverging lower and upper face portions 66a and 66b, respectively. A laterally sloping and rearwardly inclined bottom surface 68 intersects the face 66a to form a wedge-like cutter member 69 with a cutting edge 70. A sloping side face 72 intersects the face 66a of the cutting surface 66 along an edge 74. The point of intersection 76 between the cutting edge 70 and the opposite side face 78 is the cutting point.

Figure 13:
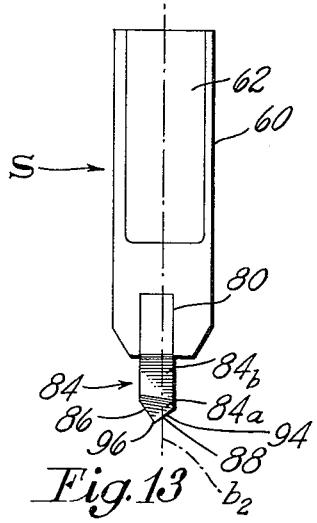
Figure 14:
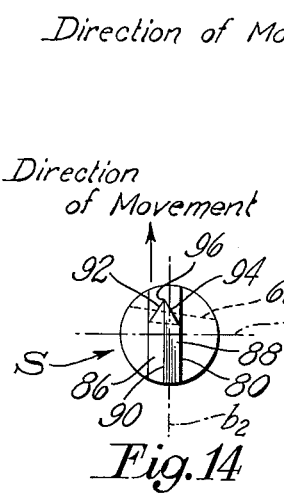
Figure 15:
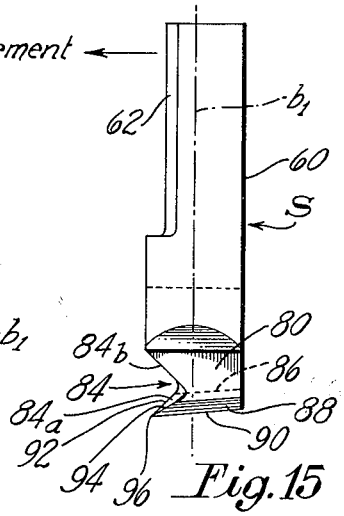

The severing tooth S, seen in FIGS. 13 through 15, also has a stem 60 and a flat 62. A carbide tip 80 inserted in the bottom of the stem is machined to the shape shown. The tip includes a forward facing, substantially V-shaped, surface 84 having diverging lower and upper face portions 84a and 84b, respectively. Inclined left and right bottom faces 86 and 88 intersect each other along a line 90 and the face 84a along lines 92 and 94, respectively. The edge 92 is the cutting edge and the intersection between the edges 92, 94 and 90 is the cutting point 96. It will be noted that the face 84a is not only inclined upwardly and rearwardly, as seen in FIGS. 13 and 14, but also laterally relative to the direction of movement of the tooth.

Figure 16:
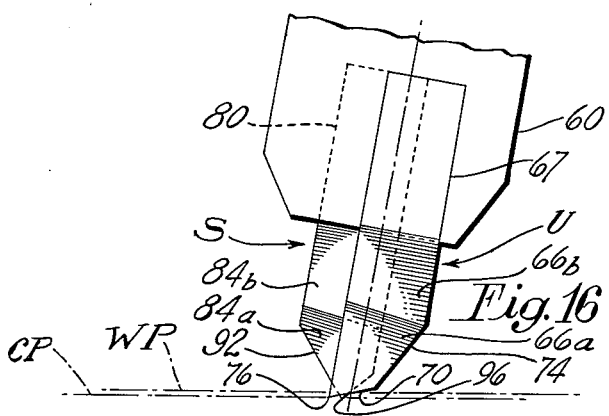

The alternate undercutting and severing teeth are shown in assembled relation in FIG. 16 which is similar to the showing of the first form of teeth in FIG. 3. The alternative form of teeth operate in the same manner as those shown in FIG. 3 with the cutting edge 70 of the undercutting tooth raising a chip which is severed by the cutting edge 92 of the severing tooth and deflected inwardly of the path of rotation of the teeth by the surface 84a of the severing tooth.

By the use of cutters made in accordance with the invention, applicant has found that sole blanks of a wide range of materials may be reduced and roughed without the production of any undesirable burrs or steps at the trailing edge of the work or loosely attached particles on the surface.

Having thus described my invention, what I claim as new and desire to secure by Letters Patent of the United States is:

1. A rotary cutter for operating upon soles and the like comprising a hub having two sets of teeth arranged, one from each set, alternately around the hub, each tooth of one set having a cutting edge for making an undercut in the surface of the sole, and a face for raising a chip from the surface of the sole, and each tooth of the other set having a cutting edge for making a severing cut through the undercut made by a tooth of the first-mentioned set, and a surface for deflecting the severed chip out of the path of rotation of said tooth.

2. A rotary cutter for operating upon soles and the like comprising an inverted cup-shaped hub having two sets of teeth removably arranged, one from each set, alternately around the hub and extending downwardly therefrom, each tooth of one set having a cutting edge for making an undercut to raise a chip from the surface of the sole and each tooth of the other set having a cutting edge for making a severing cut through the chip raised by a tooth of the first-mentioned set.

3. A rotary cutter for operating upon soles and the like comprising an inverted cup-shaped hub having two sets of teeth projecting downwardly from the hub and defining a cutting plane, said teeth being arranged, one from each set, alternately around the hub equidistant from each other and from the axis of rotation of the hub, each tooth of one set comprising a stem portion, a forward facing cutting surface having diverging upper and lower face portions, an inclined bottom surface intersecting the lower face portion, a substantially laterally sloping cutting edge formed by the intersection of the bottom surface and the lower face portion, each tooth of the other set comprising a stem portion, a forward facing cutting surface, and a cutting edge formed on one side of the cutting surface and extending upwardly and rearwardly with respect to the direction of movement of the cutter and being generally transverse of the first mentioned cutting edge.

4. A rotary cutter for operating upon soles and the like comprising an inverted cup-shaped hub rotatable about an axis, two sets of teeth projecting downwardly from the hub, said teeth being arranged, one from each set, alternately around the hub each tooth of one set having a substantially wedged shaped cutting portion including a cutting edge extending in a direction generally transverse of said axis for raising a chip from the surface of a sole and each tooth of the other set having a cutting edge extending generally transverse of said first-mentioned cutting edge for severing the chip raised by a tooth of the first-mentioned set.

5. A rotary cutter for operating upon soles and the like comprising an inverted cup-shaped hub rotatable about an axis, two sets of teeth projecting downwardly from the hub and equidistant from said axis, said teeth being arranged, one from each set, alternately around the hub, each tooth of one set having means including a cutting edge for raising a chip from the surface of a sole, each tooth of the other set having a cutting edge extending in a direction generally transverse of said first-mentioned cutting edge for severing the chip raised by a tooth of the first-mentioned set, said last-mentioned teeth each having a surface for deflecting the severed chip out of the path of rotation of said tooth.

References Cited in the file of this patent
UNITED STATES PATENTS

| | | |
|---|---|---|
| 2,648,894 | Wildhaber | Aug. 18, 1953 |
| 2,665,472 | Aschwanden et al. | Jan. 12, 1954 |
| 2,958,879 | James et al. | Nov. 8, 1960 |
| 3,061,853 | Quarmby | Nov. 6, 1962 |